(12) United States Patent
Chapman et al.

(10) Patent No.: US 11,960,340 B2
(45) Date of Patent: Apr. 16, 2024

(54) PERFORMANCE MANAGEMENT DURING POWER SUPPLY VOLTAGE DROOP

(71) Applicant: Advanced Micro Devices, Inc., Santa Clara, CA (US)

(72) Inventors: Eric J. Chapman, Cedar Park, TX (US); Stephen Victor Kosonocky, Fort Collins, CO (US); Kaushik Mazumdar, Waltham, MA (US); Vydhyanathan Kalyanasundharam, Sunnyvale, CA (US); Samuel Naffziger, Fort Collins, CO (US); Eric M. Scott, San Fransisco, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 151 days.

(21) Appl. No.: 17/521,578

(22) Filed: Nov. 8, 2021

(65) Prior Publication Data
US 2023/0144770 A1    May 11, 2023

(51) Int. Cl.
G06F 1/30    (2006.01)
(52) U.S. Cl.
CPC ..................... *G06F 1/30* (2013.01)
(58) Field of Classification Search
CPC .......................................... G06F 1/30
See application file for complete search history.

(56) References Cited

U.S. PATENT DOCUMENTS

| | | | |
|---|---|---|---|
| 6,895,520 B1 | 5/2005 | Altmejd et al. | |
| 7,159,082 B1 | 1/2007 | Wade | |
| 9,477,586 B1* | 10/2016 | Hedinger | G06F 12/00 |
| 2007/0006013 A1 | 1/2007 | Moshayedi et al. | |
| 2012/0166854 A1 | 6/2012 | Rotem et al. | |
| 2017/0212579 A1* | 7/2017 | Tirumala | G06F 13/4291 |
| 2019/0377405 A1* | 12/2019 | Uan-Zo-li | G06F 1/3206 |
| 2023/0031415 A1* | 2/2023 | Rajwan | G06F 1/3206 |

FOREIGN PATENT DOCUMENTS

| | | |
|---|---|---|
| JP | 2007206775 A | 8/2007 |
| JP | 2018043472 A | 3/2018 |

OTHER PUBLICATIONS

International Search Report and Written Opinion for International Application No. PCT/US2022/048058, dated Feb. 24, 2023, 8 pages.

* cited by examiner

*Primary Examiner* — Mark A Connolly
(74) *Attorney, Agent, or Firm* — Polansky & Associates, P.L.L.C.; Paul J. Polansky (57) ABSTRACT

A method for controlling a data processing system includes detecting a droop in a power supply voltage of a functional circuit of the data processing system greater than a programmable droop threshold. An operation of the data processing system is throttled according to a programmable step size, a programmable assertion time, and a programmable de-assertion time in response to detecting the droop.

19 Claims, 5 Drawing Sheets

PERFORMANCE MANAGEMENT DURING POWER SUPPLY VOLTAGE DROOP

BACKGROUND

Modern data processors are designed to optimize power consumption by operating in one of several available performance states or "P-states". Each P-state is defined by both an operating frequency and an operating voltage. For example, to function properly during periods of relatively high processing workloads at higher operating frequencies, a higher power supply voltage is generally required. Conversely, to save power during periods of relatively low processing workloads, the power supply voltage can be lowered while still ensuring proper operation at the operating frequency. The dynamic power consumption of a complementary metal-oxide-semiconductor (CMOS) integrated circuit is related to the power supply voltage and clock frequency by the equation:

$$P = C \times V^2 \times f \quad [1]$$

in which P is power consumption, C is dynamic capacitance of the data processor, V is the power supply voltage, and f is the operating frequency. C is fixed for a given design, but V and f are determined by the selected P-state.

Data processors typically select an appropriate P-state by measuring or estimating the processor utilization, such as by monitoring performance counters. For example, firmware can measure the processor utilization as the relative amount of time the data processor operates versus the amount of time it is idle, and can be expressed as a percentage. When making P-state changes, a voltage regulator that sets the value of V and clock generator that sets the value of f take time to stabilize at their new operating points. Because of these time requirements, P-state mechanisms work many orders of magnitude slower than the processor operating frequency, such as on the microsecond or millisecond time scale when the processor operating frequency is in the giga-Hertz (GHz) range.

Sometimes, however, the data processor's power supply voltage can experience a condition known as "droop". Voltage droop refers to a drop in voltage from the desired voltage level as the power supply drives a changing load. In a regulated system, the output voltage can sag when a load is suddenly increased very rapidly. For example, a transient loading condition may occur causing a voltage droop. If the droop is too large, then circuit failure results. On the other hand, if the P-state defines the nominal voltage level high enough for a given frequency of operation to accommodate expected droops, then on average much power is wasted.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A method for controlling a data processing system includes detecting a droop in a power supply voltage of a functional circuit of the data processing system greater than a programmable droop threshold. An operation of the data processing system is throttled according to a programmable step size, a programmable assertion time, and a programmable de-assertion time in response to detecting the droop.

A data processing system includes a plurality of memory accessing agents, a plurality of memory accessing responders, a data fabric, and a droop detector. The data fabric couples memory access requests and memory access responses between the plurality of memory accessing agents and the plurality of memory accessing responders. The droop detector activates a droop signal in response to a droop in a power supply voltage of the data processing system below a droop threshold. The data fabric throttles a flow of memory access requests between the plurality of memory accessing agents and the plurality of memory access responders in response to the droop signal.

A data processing system comprises a plurality of memory accessing agents, a memory controller, a data fabric, and a droop detector. The memory controller is adapted to be coupled to an external memory and controls accesses to the external memory using a corresponding memory access protocol. The data fabric couples the plurality of memory accessing agents to the memory controller. The droop detector is coupled to the memory controller and detects a droop in a power supply voltage of the data processing system below a droop threshold and provides a droop signal in response. The memory controller throttles a rate of memory access instructions to the external memory in response to the droop signal.

Figure 1:
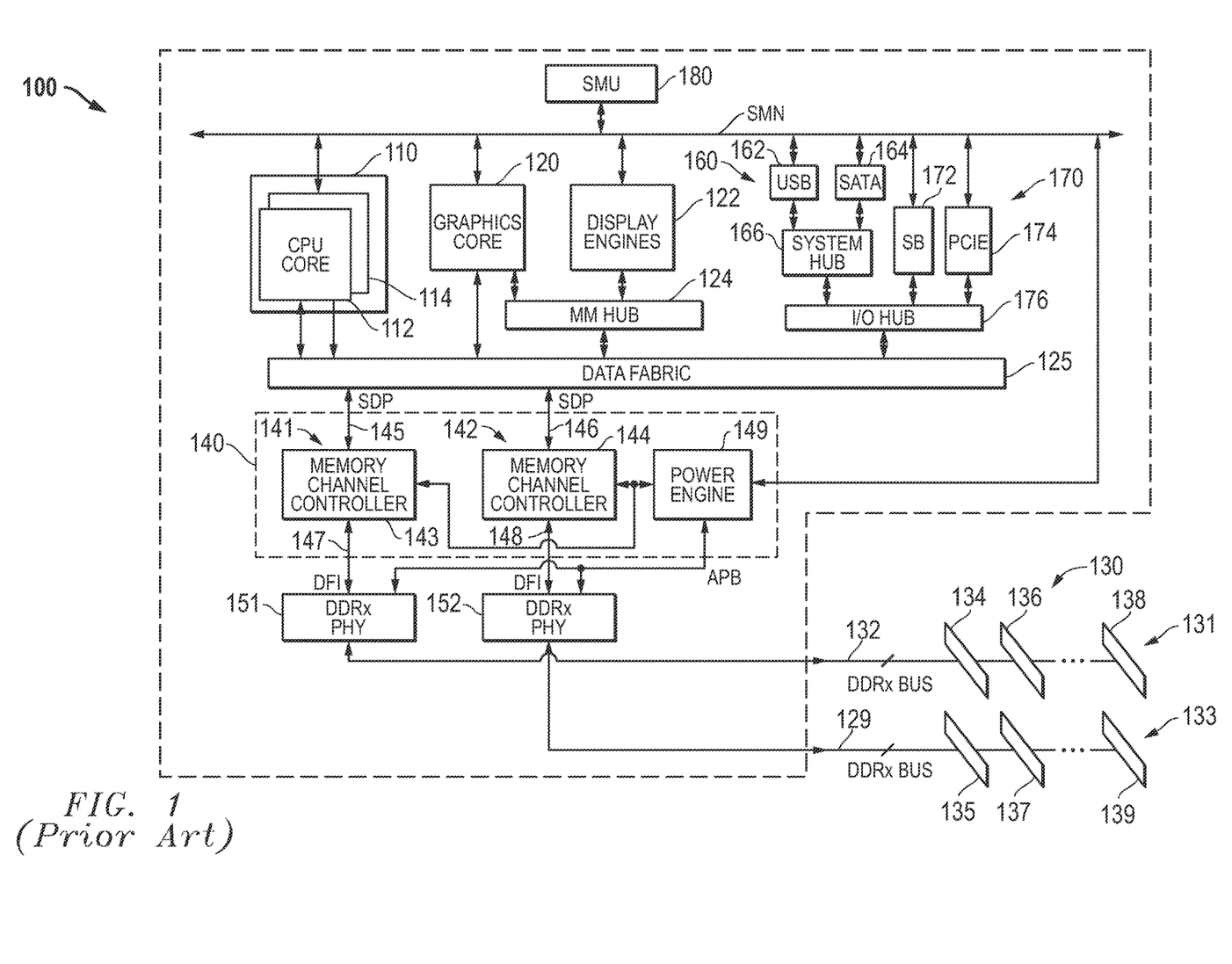
FIG. 1 illustrates in block diagram form an accelerated processing unit (APU) and memory system known in the prior art.

FIG. 1 illustrates in block diagram form an accelerated processing unit (APU) 100 and a memory system 130 known in the prior art. APU 100 is an integrated circuit suitable for use as a processor in a host data processing system, and includes generally a central processing unit (CPU) core complex 110, a graphics core 120, a set of display engines 122, a memory management hub 124, a data fabric 125, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments, CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a memory management hub 124 for uniform translation into appropriate addresses in memory system 130, and memory management hub 140 is bidirectionally connected to data fabric 125 for generating such memory accesses and receiving read data returned from the memory system.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus, for example, a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data is driven through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory management hub 140 and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the APB, and is also bidirectionally connected to memory channel controllers 143 and 144. PHY 151 has a bidirectional connection to memory channel 131. PHY 152 has a bidirectional connection to memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), low power DDR4 (LPDDR4), graphics DDR version six (gDDR6), and high bandwidth memory (HBM), and can be adapted for future memory technologies. These memories provide high bus bandwidth and high-speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a double data rate ("DDRx") bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two DDRx memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
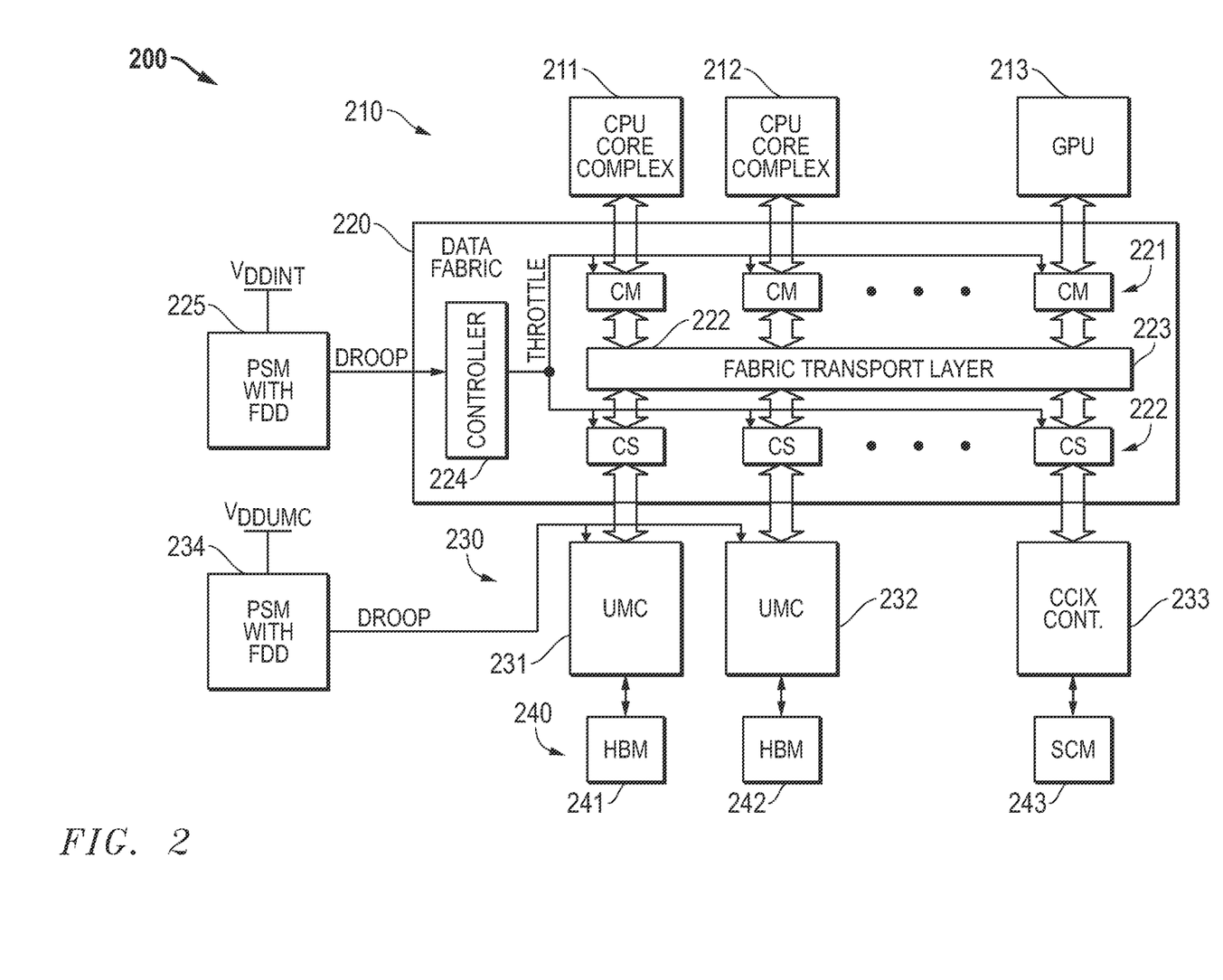
FIG. 2 illustrates in block diagram form a data processor according to some embodiments.

FIG. 2 illustrates in block diagram form a data processing system 200 according to some embodiments. Data processing system 200 includes generally a set of memory accessing agents 210, a data fabric 220, a set of memory accessing responders 230, and a set of external memory resources 240.

In the embodiment of FIG. 2, memory accessing agents 210 include a CPU core complex 211, a CPU core complex 212, and a graphics processing unit (GPU) 213. Each of CPU core complexes 211 and 212 include multiple CPU cores each having their own dedicated upper-level caches, with a last level cache (LLC) shared by all CPU cores in the CPU core complex. GPU 213 is a high-performance graphics processing unit that performs functions such as shading, rendering, rasterization, and the like. A typical implementation of GPU 213 would be a data processor that is responsive to high-level graphics primitive commands such as OpenGL commands that are executed using a massively parallel single-instruction, multiple-data (SIMD) processor. Because of the computational intensity, GPU 213 makes a large number of memory references and includes its own internal cache hierarchy.

Data fabric 220 includes a set of coherent master ports 221 each labelled "CM" and a set of coherent slave ports 222 each labelled "CS" interconnected by and through a fabric transport layer 223, and a controller 224. As used herein, a coherent port is considered to be a master port because it can be connected to memory accessing agents that are capable of initiating memory access requests, regardless of whether the memory access requests are read or write accesses. Likewise, a coherent slave port is considered to be a slave port because it connects to memory access responders that are capable of responding to memory access requests, regardless of whether the memory access requests are read or write accesses.

Data fabric 220 is constructed to have a coherent master port for each of memory accessing agents 210. Each coherent master port 221 has a bidirectional upstream port, a bidirectional downstream port, and a control input, as well as its own internal buffering for both accesses received from a coherent master and responses received from a coherent slave through fabric transport layer 223. Each coherent master port 221 also has a control interface connected to its upstream port to provide backpressure signaling to corresponding memory accessing agents to avoid overrunning its limited buffer space. Data fabric 220 is likewise constructed to have a coherent slave port for each of memory accessing responders 230. Each coherent slave port 222 has buffering that allows memory access requests to be stored before or after being processed through fabric transport layer 223, depending the direction. Controller 224 has an input for receiving a signal labelled "DROOP", and an output connected to the control inputs of each coherent master port 221 and each coherent slave port 222 for providing a signal labelled "THROTTLE" thereto.

Data fabric 220 also has a power supply monitor 225 with a fast droop detector (FDD) associated with it. Power supply monitor 225 has an input for receiving a power supply voltage that is associated with data fabric 220 and memory accessing agents 210 labelled "$V_{DDINT}$", and an output for providing the DROOP signal to the input of controller 224. Power supply monitor 225 can be designed integrally with data fabric 220, or it can be a separate element and designed integrally with other power supply monitor circuitry, but in either case it is associated with data fabric 220 and memory accessing agents 210 and monitors the power supply voltage by which they operate, i.e., $V_{DDINT}$.

Memory accessing responders 230 include a unified memory controller 231 labelled "UMC", a unified memory controller 232, and a cache coherent interconnect for accelerators (CCIX) controller 233 labelled "CCIX CONT". Each of unified memory controllers 231 and 232 has an upstream port connected to data fabric 220 through a corresponding coherent slave port 222, a downstream port connected to a corresponding memory device, and a control input. CCIX controller 223 has an upstream port connected to a corresponding coherent slave port 222, and a downstream port connected to a corresponding memory device.

Unified memory controllers 231 and 232 also have a power supply monitor 234 with a fast droop detector associated with them. Power supply monitor 234 has an input for receiving a power supply voltage that is associated with unified memory controllers 231 and 232 labelled "$V_{DDUMC}$", and an output for providing a different DROOP signal to the control inputs of unified memory controllers 231 and 232. Power supply monitor 234 can be designed integrally with unified memory controllers 231 and 232, or it can be a separate element and designed integrally with other power supply monitor circuitry, but in either case it is associated with unified memory controllers 231 and 232 and monitors the power supply voltage by which they operate, i.e., $V_{DDUMC}$.

External memory resources 240 include a high-bandwidth memory 241 labelled "HBM", a high bandwidth memory 242 labelled "HBM", and a storage class memory 243 labelled "SCM". High-bandwidth memories 241 and 242 are bidirectionally connected to the downstream ports of unified memory controllers 231 and 232, respectively. Storage class memory 243 is bidirectionally connected to the downstream port of CCIX controller 233.

Data processing system 200 is a highly integrated, high-performance digital data processor that performs many of the functions associated with a personal computer, a workstation, a file server, or the like. It implements a unified memory space in which all memory in the system is potentially visible to each memory accessing agent 210. Data fabric 220 is the medium by which accesses initiated by a memory accessing agent are provided to a memory accessing responder, and a response from a memory accessing responder is returned to the initiating memory accessing agent. Data fabric 220 uses a central fabric transport layer 223 to multiplex the accesses and responses between the corresponding master and slave ports based on a system address map. The operation of memory accessing agents 210 is conventional and well known in the art and will not be described further. Likewise, the operation of memory accessing responders 230 is well known and is typically specified by a published standard, such as one or more of the double data rate (DDR) synchronous dynamic random-access memory (SDRAM) and HBM standards published by the Joint Electron Devices Engineering Council (JEDEC), and will not be described further.

In accordance with various embodiments described herein, data fabric 220 includes power supply monitor 225 associated with it and with memory accessing agents 210 and that provides the DROOP signal in response to a power supply droop of the $V_{DDINT}$ power supply of at least a threshold amount. Power supply monitor 225 captures the transient power supply droop and provides the DROOP signal when the droop exceeds the threshold amount. Controller 224, in turn, provides the THROTTLE signal to coherent master ports 221 and coherent slave ports 222 to cause them to reduce the rate of accesses accepted to or from the associated memory accessing agent or memory accessing responder, as the case may be. Thus, in response to the DROOP signal, which may cause a malfunction at the current operating speed, controller 224 causes data fabric 220 to throttle (i.e., forcibly reduce) the amount of data traffic moving through them. In some embodiments, the droop throttling will work with existing throttling mechanisms of memory accessing agents and coherent master ports to reduce the data flow, which will cause stalls in the memory accessing agents and force them to reduce their workload, quickly mitigating the power supply droop.

Similarly, unified memory controllers 231 and 232 include power supply monitor 234 associated with them that provides its DROOP signal in response to a power supply droop of the $V_{DDUMC}$ supply of at least a threshold amount. Power supply monitor 234 captures the transient power supply droop and provides the DROOP signal when the droop exceeds the threshold amount. The DROOP signal causes them to reduce the rate of accesses accepted from the associated memory accessing agent through data fabric 220. Thus, in response to the DROOP signal, which may cause a malfunction at the current operating speed, unified memory controllers 231 and 232 throttle the number of memory access requests sent to high-bandwidth memory 241 and high-bandwidth memory 242. In this example, the droop throttling will work with existing backpressure mechanisms of unified memory controllers 231 and 232, data fabric 220, and memory accessing agents 210 to reduce the data flow. The reduction in data flow will eventually cause stalls in the memory accessing agents and force them to reduce their workloads, thereby mitigating the power supply droop.

Using either or both of these two mechanisms, data processing system 200 prevents or reduces the risk of functional failure during sudden periods of high processing activity that cause the power supply to droop dangerously below its required level for the corresponding clock frequency. Moreover, it allows the throttle to be removed as soon as the workload reaches a lower level that does not cause the power supply droop. In this respect, the fast droop detector in power supply monitors 225 and 234 implement hysteresis, in which the threshold below which the power supply voltage must fall before it asserts the DROOP signal is lower than the threshold above which the power supply voltage must rise to de-assert the DROOP signal.

In some embodiments that will be explained more fully below, the fast droop detector of power supply monitors 225 and 234 implement a more extensive control mechanism in which the amount of throttling varies in steps according to the present amount of throttling. For this type of throttling, the THROTTLE signal includes not only the command to throttle the activity of each coherent master port and coherent slave port, but also an amount of throttling. In this way, a more prolonged excessive workload will be slowed to a sustainable level until the workload is reduced without exiting the current P-state.

Figure 3:
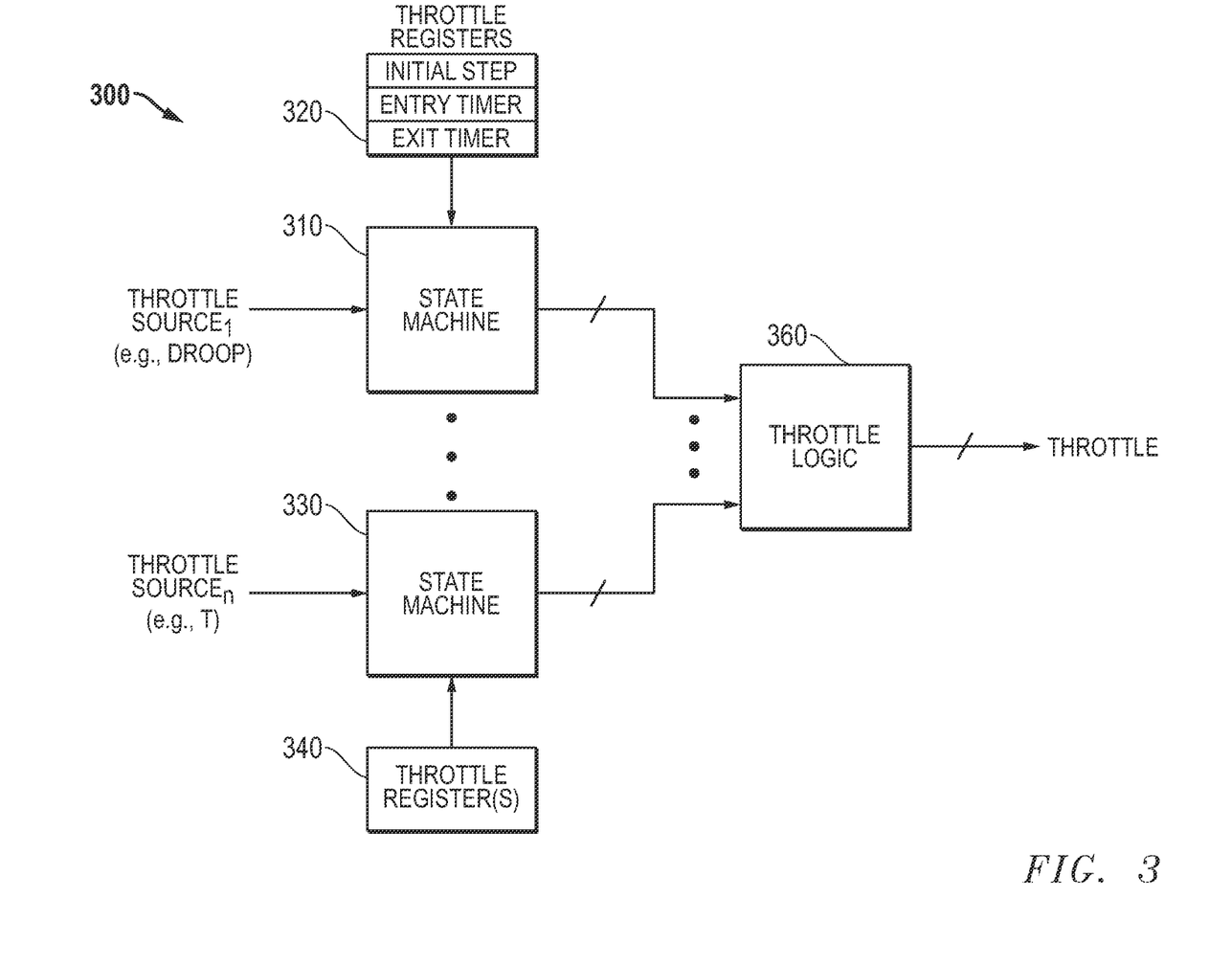
FIG. 3 illustrates in block diagram form a portion of a controller suitable for use in the controller of FIG. 2 according to some embodiments.

FIG. 3 illustrates in block diagram form a portion of a controller 300 suitable for use in controller 224 of FIG. 2 according to some embodiments. Controller 300 includes generally a first state machine 310, a first set of throttle registers 320, a second state machine 330, a second set of throttle registers 340, and a throttle logic circuit 360.

First state machine 310 has a first input for receiving a first throttle input labelled "THROTTLE SOURCE$_1$", a second input, and an output. In controller 300, state machine 310 is responsive to the DROOP signal as the throttle source from power supply monitor 225. The second input of state machine 310 receives the outputs of a set of throttle registers 320 that specify the parameters of the throttle operation related to the power supply droop condition. In some embodiments, the parameters include an initial STEP SIZE, an ENTRY TIMER value, and an EXIT TIMER value. The way in state machine 310 uses these parameters in response to a power supply droop condition will be explained further below. State machine 310 has an output for providing a control signal that specifies the throttle action.

Second throttle state machine 330 has a first input for receiving a first throttle input labelled "THROTTLE SOURCE$_n$", a second input, and an output. In controller 300, state machine 310 is responsive to another DROOP signal as the throttle source, such as a temperature signal labelled "T" form the output of a temperature sensor. The second input of state machine 330 receives the outputs of a one or more throttle registers 340 that specify the parameters of the throttle operation related to the power supply droop condition. In some embodiments, these parameters may also include an initial step size, an entry timer, and an exit timer, but in other embodiments may include different parameters specific to temperature throttling, which may be different than those used for droop throttling. State machine 330 has an output for providing a control signal that specifies the throttle action.

Throttle logic 360 has inputs connected to outputs of respective state machines, such as state machines 310 and 330, and an output for providing the THROTTLE signal to the appropriate functional circuits.

Controller 300 is an example of how the droop-based performance throttle mechanism described herein can be integrated with and leverage the existence of one or more throttling mechanisms, such as the temperature-based throttling shown in FIG. 3. Throttle logic circuit 360 can be implemented in a variety of ways and implement a variety of throttling policies. According to some embodiments, controller 300 can select the deepest throttling amount indicated by the throttling state machines, including state machine 310 that is responsive to the power supply droop and state machine 330 that is responsive to excessive temperature.

Figure 4:
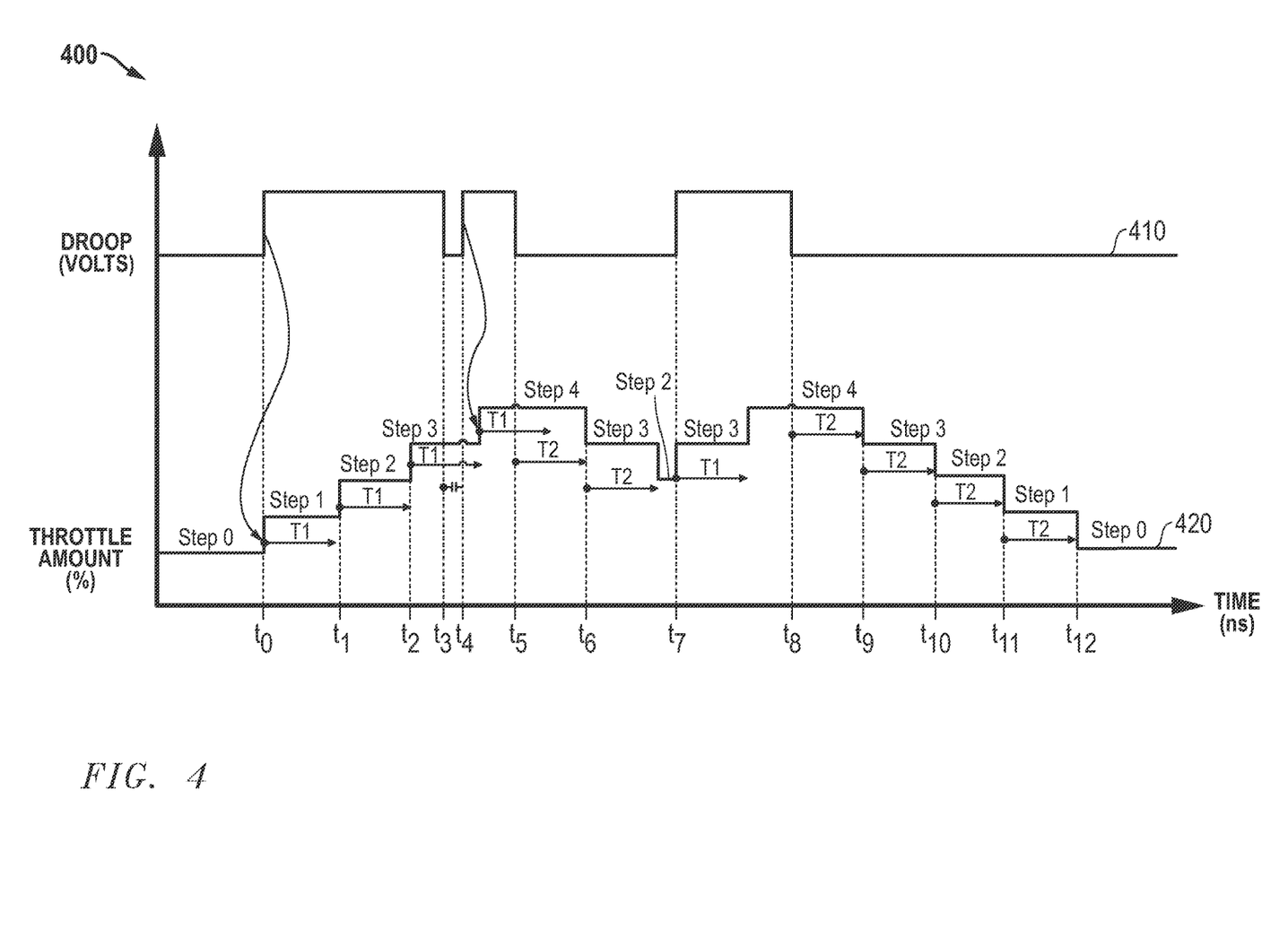
FIG. 4 illustrates a timing diagram showing an example of the operation of the controller of FIG. 3.

FIG. 4 illustrates a timing diagram 400 showing an example of the operation of controller 300 of FIG. 3 when responding to a power supply droop. In timing diagram 400, the horizontal axis represents time in nanoseconds (ns), and the vertical axis represents the DROOP signal in volts and the throttle amount in percent. In particular, timing diagram 400 shows a waveform 410 representing the DROOP signal in volts, and a waveform 420 showing a throttle amount as a percentage of available bandwidth.

As shown by waveform 410, the DROOP signal has an inactive state at a relatively low voltage, and an active state at a relatively high voltage, and represents the state of the DROOP signal over time. Thus, when the DROOP signal is at a logic low voltage, it represents the power supply voltage having risen above a high threshold, and when the DROOP signal at a logic high voltage, it represents the power supply voltage having fallen below a low threshold.

Timing diagram 400 also shows various time points of interest, labelled consecutively "$t_0$" through "$t_{12}$". Before time $t_0$, state machine 310 receives the DROOP signal at a logic low (de-asserted) state, and does not throttle the operation of the associated circuit, a state known as "Step 0". At time $t_0$, the fast droop detector detects that the associated power supply voltage has fallen below the low threshold, and asserts the DROOP signal. The assertion of the DROOP signal causes controller 300 to implement a throttle operation to reduce the performance of data fabric 220 by a percentage according to the INITIAL STEP amount. A timer in state machine 310 counts to determine the amount of time the DROOP signal is active, and when it times out at time $t_1$, state machine 310 increases the throttle amount by an additional INITIAL STEP amount so that the throttle amount increases to "Step 2". When the timer again times out at time $t_2$, state machine 310 further increases the throttle amount by an additional INITIAL STEP amount so that the throttle amount increases to "Step 3".

After time $t_1$, the throttling is sufficient to reduce the activity of the devices on the $V_{DDINT}$ domain such that $V_{DDINT}$ temporarily rises above the high threshold, causing the timer to be reset. Since the DROOP signal is again asserted at time $t_4$ before an expiration of the EXIT TIMER amount, the throttle remains at Step 3 until the timer reaches the ENTRY TIMER value shortly after $t_4$, at which time the throttle amount increases by another INITIAL STEP amount so that the throttle amount reaches "Step 4", At $t_5$, however, the performance throttling mechanism has started to mitigate the droop sufficiently such that the DROOP is removed for a more sustained period. At time $t_6$ the EXIT TIMER times out, and causes the throttle amount to be reduced to Step 3. Shortly afterward, the EXIT TIMER again times out to cause the throttle amount to be further reduced to Step 2. However, this reduction in throttling causes the fast droop detector to again assert the DROOP signal, such that at time "$t_7$", state machine 310 again increases the throttle percentage to Step 3. After the ENTRY TIMER again times out, state machine 310 again increases the throttle percentage back to Step 4. If the workload initiated by the particular software program remains relatively high and constant, it is possible that these periodic changes in the throttle amounts can reach a steady state of changing between two or more adjacent Step amounts.

After time $t_8$, the processor workload decreases and the THROTTLE signal is de-asserted thereafter. The EXIT TIMER value elapses repeatedly such that at times $t_9$, $t_{10}$, $t_{11}$, and $t_{12}$ state machine 310 reduces the throttle amount successively through Step 3, Step 2, and Step 1 until it eventually returns to Step 0 at time $t_{12}$ and remains in Step 0 thereafter.

By including performance throttling triggered by power supply voltage droop in the various embodiments described herein, the data processing system reduces performance quickly but only in an amount needed to mitigate the droop. Thus, as shown in FIG. 4, the responsiveness is on the nanosecond time scale, as opposed to the relatively slow P-state mechanism. Since less margin needs to be built into the voltage components of the P-state voltage-frequency pairs, the processor reduces power consumption during non-droop conditions.

The throttling parameters used by state machine 310 as well as the droop thresholds do need to set according to the characteristics of the circuit blocks affected by the throttling, and be responsive enough to avoid program failure due to the power supply droop. An example of these considerations will now be explained with respect to the memory controller throttling mechanism.

Figure 5:
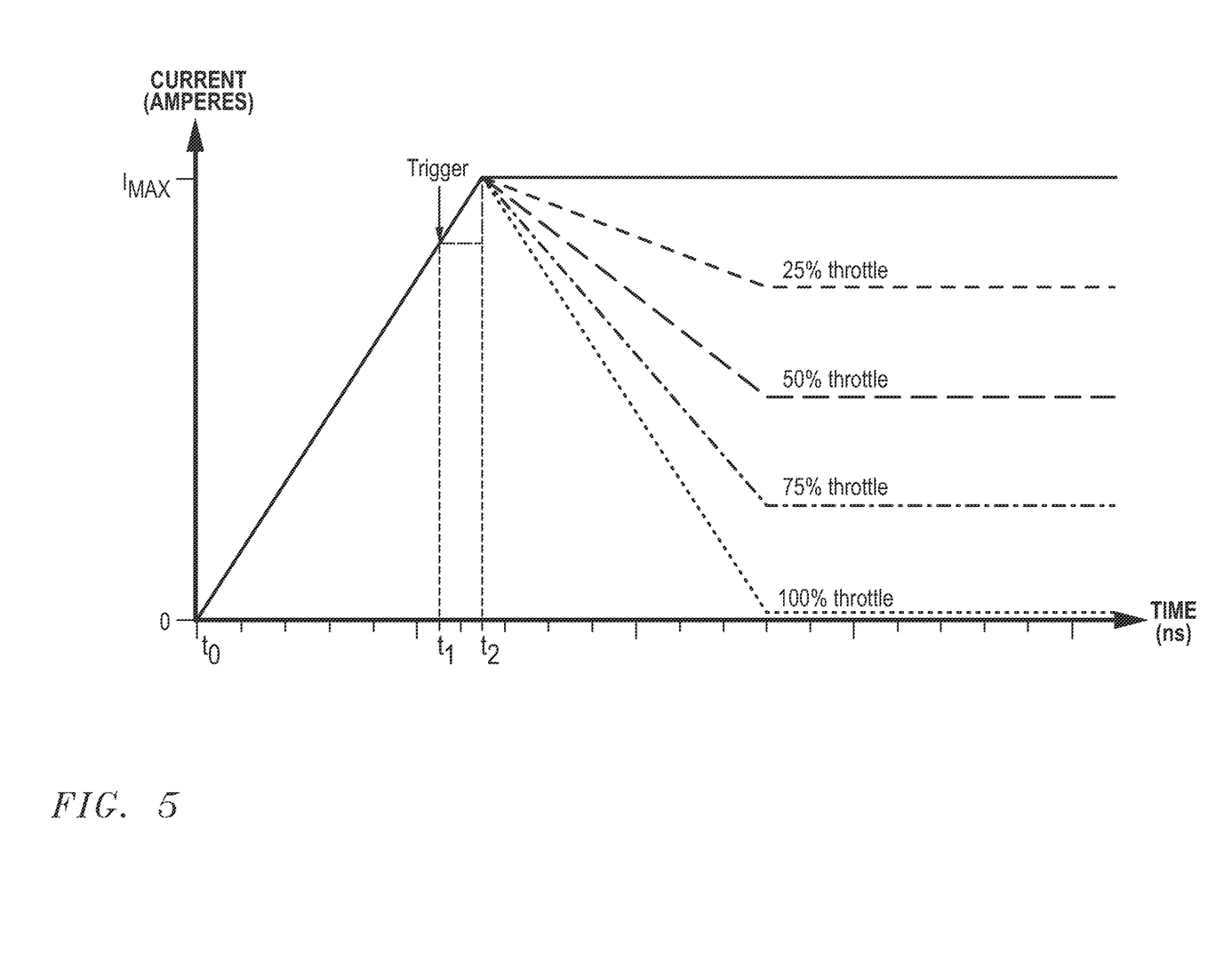
FIG. 5 illustrates a timing diagram showing the reaction time of the data fabric throttling system of FIG. 3 for varying throttle amounts.

FIG. 5 illustrates a timing diagram 500 showing the reaction time of the data fabric throttling system of FIG. 3 on the overall data processor current consumption for varying throttle amounts. In timing diagram 500, the horizontal axis represents time in ns, and the vertical axis represents data processing system current in Amperes (A). Timing diagram 500 shows three time points of interest, labelled "$t_0$", "$t_1$", and "$t_2$". Timing diagram 500 shows a uniform current ramp from $t_0$ at which the memory controller consumes no current, until $t_2$ at which the memory controller saturates at a current labelled "$I_{MAX}$" and the DROOP hits its maximum. The initial reaction time of data fabric 220 and all its connected components on the $V_{DDINT}$ domain, i.e., the amount of time before the system starts to react to a throttle and lower activity and power consumption, is between $t_1$ and $t_2$, and the DROOP needs to be detected that amount of time before the saturation point at $t_2$. Thus, power supply monitor 225 needs to detect the droop and assert the DROOP signal at a threshold corresponding to time $t_1$. As shown in FIG. 5, at about the time that the current reaches its saturation value, the throttle mechanism starts to reduce the power supply voltage droop and current. The reduction of the current in the data processor by the step size, however, takes a longer time because the existing backpressure mechanisms have to propagate through data fabric 220 all the way back to the memory accessing agents. At a 25% throttle amount, the throttle starts ramping down until it converges at a 25% current reduction. Likewise, at 50%, 75%, and 100% throttle amounts, the total current converges after about the same amount of time. Thus, by throttling the memory controller traffic, the overall chip workload will also be reduced through existing backpressure mechanisms.

The specific values for saturation currents, reaction times, pipeline depths, etc. will vary from implementation to implementation. However, the analysis techniques described with respect to FIG. 5 for the specific data processing system shown and described herein can be applied to these different implementations of data processing system components correspondingly.

An integrated circuit containing the throttle mechanisms described herein, or any portion thereof, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, while the present application describes functional throttling in the data fabric and the memory controllers, in other embodiments, the throttling can be applied at other places in the data processor's architecture such as directly at the memory accessing agents themselves, at their caches, and the like. The amount of time entering and exiting each throttling step and the throttling step size can be fixed or can be programmed. Each power supply monitor with a fast droop detector can be designed with the circuits being throttled, or can be designed separately.

Accordingly, it is intended by the appended claims to cover all modifications of the disclosed embodiments that fall within the scope of the disclosed embodiments.

What is claimed is:

1. A method for controlling a data processing system, comprising:
    detecting a droop in a power supply voltage of a functional circuit of the data processing system greater than a programmable droop threshold; and throttling an operation of the data processing system according to a programmable step size, a programmable assertion time, and a programmable de-assertion time specified by an output of one or more throttle registers in response to detecting said droop.

2. The method of claim 1, wherein said throttling comprises:
throttling a flow of memory access requests between a memory accessing agent and a memory accessing responder through a data fabric.

3. The method of claim 2, wherein said throttling further comprises:
throttling said flow of memory access requests using a coherent master port coupled to said memory accessing agent and a coherent slave port coupled to said memory accessing responder through a fabric transport layer.

4. The method of claim 1, wherein said throttling further comprises:
throttling a flow of memory access requests from a memory accessing agent to an external memory in a memory controller.

5. The method of claim 4, further comprising:
setting said programmable droop threshold in response to a type of memory accessed by said memory controller.

6. The method of claim 1, wherein the throttling comprises:
setting a throttle amount according to said programmable step size in response to detecting said droop;
increasing throttle amount by said programmable step size if said power supply voltage remains below said programmable droop threshold for said programmable assertion time; and
decreasing said throttle amount by said programmable step size if said power supply voltage rises above said programmable droop threshold for said programmable de-assertion time.

7. The method of claim 1, further comprising:
operating at least one processor core of the data processing system in a respective operational power state defined by a nominal clock frequency and a nominal voltage; and
maintaining said nominal clock frequency and said nominal voltage of each of the at least one processor core throughout said throttling.

8. A data processing system, comprising:
a plurality of memory accessing agents;
a plurality of memory accessing responders;
a data fabric for coupling memory access requests and memory access responses between said plurality of memory accessing agents and said plurality of memory accessing responders; and
a droop detector for activating a droop signal in response to a droop in a power supply voltage of the data processing system below a droop threshold,
wherein said data fabric throttles a flow of memory access requests between said plurality of memory accessing agents and said plurality of memory access responders using backpressure in response to said droop signal.

9. The data processing system of claim 8, wherein said data fabric throttles said flow of memory access requests further according to a programmable step size, a programmable assertion time, and a programmable de-assertion time.

10. The data processing system of claim 8, wherein said data fabric comprises:
a plurality of coherent master ports coupled to respective ones of said plurality of memory accessing agents;
a plurality of coherent slave ports coupled to respective ones of said plurality of memory accessing responders;
a fabric transport layer for routing memory access requests and memory access responses between said plurality of coherent master ports and said plurality of coherent slave ports; and
a controller for providing an overall throttle amount to said plurality of coherent master ports and said plurality of coherent slave ports in response to said droop signal.

11. The data processing system of claim 10, wherein said controller comprises:
at least one register for storing a programmable step size, a programmable assertion time, and a programmable de-assertion time; and
a first throttle state machine coupled to said at least one register for providing a first throttle amount in response to said programmable step size, said programmable assertion time, and said programmable de-assertion time.

12. The data processing system of claim 11, wherein said first throttle state machine:
sets a first throttle amount to said programmable step size in response to an activation of said droop signal;
increases said first throttle amount if said droop signal remains active for said programmable assertion time; and
subsequently decreases said first throttle amount if said droop signal is inactive for said programmable de-assertion time.

13. The data processing system of claim 11, wherein said controller comprises:
a second state machine for providing a second throttle amount in response to a second input signal; and
throttle logic for providing said overall throttle amount according to a highest one of said first throttle amount and said second throttle amount.

14. The data processing system of claim 13, wherein said second input signal comprises a temperature.

15. A data processing system, comprising:
a plurality of memory accessing agents;
a memory controller adapted to be coupled to an external memory for controlling accesses to said external memory using a corresponding memory access protocol;
a data fabric for coupling said plurality of memory accessing agents to said memory controller; and
a droop detector coupled to said memory controller for detecting a droop in a power supply voltage of the data processing system below a droop threshold and provides a droop signal in response,
wherein said data processing system throttles an operation of the data processing system according to a programmable step size, a programmable assertion time, and a programmable de-assertion time specified by an output of one or more throttle registers in response to detecting said droop.

16. The data processing system of claim 15, wherein said memory controller:
sets a first throttle amount to said programmable step size in response to an activation of said droop signal;
increases said first throttle amount if said droop signal remains active for said programmable assertion time; and
subsequently decreases said first throttle amount if said droop signal is inactive for said programmable de-assertion time.

17. The data processing system of claim 16, wherein said memory controller throttles said rate of memory access instructions to said external memory further in response to an input signal.

18. The data processing system of claim 17, wherein said input signal comprises a temperature.

19. The data processing system of claim 16, wherein the data processing system sets said droop threshold according to a type of said external memory.

* * * * *